(12) United States Patent
Balchandran et al.

(10) Patent No.: US 9,342,588 B2
(45) Date of Patent: May 17, 2016

(54) RECLASSIFICATION OF TRAINING DATA TO IMPROVE CLASSIFIER ACCURACY

(75) Inventors: Rajesh Balchandran, Congers, NY (US); Linda M. Boyer, Ossining, NY (US); Gregory Purdy, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1566 days.

(21) Appl. No.: 11/764,291

(22) Filed: Jun. 18, 2007

(65) Prior Publication Data
US 2008/0312906 A1 Dec. 18, 2008

(51) Int. Cl.
*G06F 17/27* (2006.01)
*G06F 17/30* (2006.01)

(52) U.S. Cl.
CPC ............................. *G06F 17/30705* (2013.01)

(58) Field of Classification Search
CPC .............. G06F 17/2775; G06F 17/278; G06F 17/2785; G06F 17/3061; G06F 17/30705; G10L 2015/088; G10L 15/04; G10L 15/142; G10L 15/18
USPC .................. 704/1, 9, 256, 257; 715/256, 273; 702/182
See application file for complete search history.

(56) References Cited

U.S. PATENT DOCUMENTS

| | | | |
|---|---|---|---|
| 5,477,451 A | 12/1995 | Brown et al. | |
| 5,625,748 A | 4/1997 | McDonough et al. | |
| 5,675,706 A * | 10/1997 | Lee | G10L 15/04 704/254 |
| 6,311,152 B1 * | 10/2001 | Bai | G06F 17/277 704/251 |
| 6,609,087 B1 | 8/2003 | Miller et al. | |
| 6,615,172 B1 * | 9/2003 | Bennett | G06F 17/2775 704/257 |
| 6,636,162 B1 | 10/2003 | Kushler et al. | |
| 6,732,090 B2 | 5/2004 | Shanahan | |
| 6,816,858 B1 | 11/2004 | Coden et al. | |
| 6,931,351 B2 * | 8/2005 | Verma | G06K 9/6293 382/224 |
| 7,275,033 B1 | 9/2007 | Zhao | |
| 7,386,440 B2 | 6/2008 | Balchandran et al. | |
| 7,509,578 B2 * | 3/2009 | Rujan et al. | G06F 17/3071 715/273 |
| 7,606,700 B2 | 10/2009 | Ramsey et al. | |
| 7,835,911 B2 | 11/2010 | Balchandran et al. | |
| 8,285,539 B2 | 10/2012 | Balchandran et al. | |
| 8,521,511 B2 | 8/2013 | Balchandran et al. | |

(Continued)

OTHER PUBLICATIONS

U.S. Appl. No. 11/764,274, Non-final Office Action Jun. 10, 2010, 29 pg.
U.S. Appl. No. 11/764,274, Non-Final Office Action, Dec. 7, 2010, 31 pg.
U.S. Appl. No. 11/764,274, Non-Final Office Action, May 10, 2011, 18 pg.

(Continued)

*Primary Examiner* — Michael Colucci
(74) *Attorney, Agent, or Firm* — Cuenot, Forsythe & Kim, LLC

(57) ABSTRACT

A method of creating a statistical classification model for a classifier within a natural language understanding system can include processing training data using an existing statistical classification model. Sentences of the training data correctly classified into a selected class of the statistical classification model can be selected. The selected sentences of the training data can be assigned to a fringe group or a core group according to confidence score. The training data can be updated by associating the fringe group with a fringe subclass of the selected class and the core group with a core subclass of the selected class. A new statistical classification model can be built from the updated training data. The new statistical classification model can be output.

17 Claims, 5 Drawing Sheets

(56) References Cited

U.S. PATENT DOCUMENTS

| | | | |
|---|---|---|---|
| 9,058,319 B2 | 6/2015 | Balchandran et al. | |
| 2002/0002450 A1* | 1/2002 | Nunberg | G06F 17/271 704/1 |
| 2002/0099730 A1* | 7/2002 | Brown | G06F 17/3061 715/256 |
| 2002/0123891 A1 | 9/2002 | Epstein | |
| 2002/0196679 A1 | 12/2002 | Lavi et al. | |
| 2003/0130841 A1 | 7/2003 | Bangalore et al. | |
| 2003/0191625 A1* | 10/2003 | Gorin | G06F 17/278 704/1 |
| 2004/0148170 A1 | 7/2004 | Acero | |
| 2004/0243408 A1 | 12/2004 | Gao et al. | |
| 2005/0075878 A1 | 4/2005 | Balchandran et al. | |
| 2006/0116862 A1 | 6/2006 | Carrier et al. | |
| 2007/0106496 A1 | 5/2007 | Ramsey | |
| 2007/0124134 A1 | 5/2007 | Van Kommer | |
| 2008/0208567 A1 | 8/2008 | Brockett et al. | |
| 2008/0310718 A1 | 12/2008 | Balchandran et al. | |
| 2008/0312904 A1 | 12/2008 | Balchandran et al. | |
| 2008/0312905 A1 | 12/2008 | Balchandran et al. | |
| 2008/0319735 A1* | 12/2008 | Kambhatla | G06F 17/277 704/9 |
| 2010/0100380 A1 | 4/2010 | Tur | |
| 2013/0262093 A1 | 10/2013 | Balchandran et al. | |
| 2014/0379326 A1* | 12/2014 | Sarikaya | G10L 15/18 704/9 |

OTHER PUBLICATIONS

U.S. Appl. No. 11/764,274, Final Office Action, Jul. 14, 2011, 27 pg.
U.S. Appl. No. 11/764,274, Examiner's Answer to Appeal Brief, Dec. 9, 2011, 29 pg.
U.S. Appl. No. 11/764,274, Notice of Allowance, Feb. 13, 2015, 9 pg.
U.S. Appl. No. 11/764,285, Non-Final Office Action, Jul. 20, 2010, 20 pg.
U.S. Appl. No. 11/764,285, Final Office Action, Dec. 29, 2010, 29 pg.
U.S. Appl. No. 11/764,285, Non-Final Office Action, Aug. 12, 2010, 25 pg.
U.S. Appl. No. 11/764,285, Final Office Action, Jan. 20, 2012, 26 pg.
U.S. Appl. No. 11/764,285, Notice of Allowance, Jun. 4, 2012, 11 pg.
U.S. Appl. No. 11/764,294, Non-final Office Action Dec. 8, 2010, 6 pg.
U.S. Appl. No. 11/764,294, Final Office Action Apr. 20, 2011, 8 pg.
U.S. Appl. No. 11/764,294, Non-final Office Action, Nov. 7, 2012, 13 pg.
U.S. Appl. No. 11/764,294, Final Office Action, Mar. 19, 2013, 14 pg.
U.S. Appl. No. 11/764,294, Notice of Allowance, Apr. 18, 2012, 6 pg.
U.S. Appl. No. 13/897,780 Non-Final Office Action, Aug. 12, 2015, 12 pg.
Gupta, N. et al., "The AT&T Spoken Language Understanding System," IEEE Trans. on Audio, Speech & Language Processing, vol. 14, No. 1, Jan. 2006, 10 pgs.

* cited by examiner

RECLASSIFICATION OF TRAINING DATA TO IMPROVE CLASSIFIER ACCURACY

BACKGROUND OF THE INVENTION

Natural language understanding (NLU) refers to the technology that allows computers to understand, or derive meaning from, written human languages. In general, NLU systems determine meaning from text. The meaning, and potentially other information extracted from the text, can be provided to other systems. For example, an NLU system used for an airline can be trained to recognize user intentions such as making a reservation, cancelling a reservation, checking the status of a flight, etc. from received text. The text provided to the NLU system as input can be obtained from a speech recognition system, keyboard entry, or some other mechanism. The NLU system determines the meaning of the text and typically provides the meaning, or user intention, to one or more other applications. The meaning can drive business logic, effectively trigging some programmatic function corresponding to the meaning. For example, responsive to a particular meaning, the business logic can initiate a function such as creating a reservation, cancelling a reservation, etc.

A classifier functions as part of an NLU system. At runtime, the classifier receives a text input and determines one of a plurality of classes to which the text input belongs. The classifier utilizes a statistical classification model (statistical model) to classify the text input. Each class corresponds to, or indicates, a particular meaning. For example, a text input such as "I would like to book a flight" can be classified into a class for "making a reservation." This class, and possibly other information extracted from the text input, can be passed along to another application for performing that action.

The statistical model used by the classifier is generated from a corpus of training data. The corpus of training data can be formed of text, feature vectors, sets of numbers, or the like. Typically, the training data is tagged or annotated to indicate meaning. The statistical model is built from the annotated training data. Often, training data includes one or more outlier portions of text. "Outlier text", or simply an "outlier," can refer to a portion of text that specifies a less common, or less orthodox, way of expressing an intention or meaning in a written human language.

Both outliers and non-outliers must be reliably processed by a classifier. Accordingly, outliers are commonly included within training data in an effort to adequately train the statistical model. Conventional techniques for generating statistical models, however, do not handle outliers in the most efficient or accurate manner. Often, the inclusion of outliers within training data does not lead to a statistical model that can reliably classify outliers. Moreover, the resulting statistical model, in many cases, classifies non-outlier text input with less certitude. For example, the confidence score associated with a classification result for a non-outlier typically is lower than otherwise expected. Generally, a confidence score indicates the likelihood that the class determined for a given text input by the classifier using the statistical model is correct.

BRIEF SUMMARY OF THE INVENTION

The present invention relates to statistical classification models (statistical models) for use with natural language understanding (NLU) systems. One embodiment of the present invention can include a method of creating a statistical model for use with an NLU system. The method can include processing training data using an existing statistical model, selecting sentences of the training data correctly classified into a selected class of the existing statistical model, and assigning each selected sentence of the training data to a fringe group or a core group according to confidence score. The method further can include updating the training data by associating the fringe group with a fringe subclass of the selected class and the core group with a core subclass of the selected class. The method also can include building a new statistical classification model from the updated training data and outputting the new statistical classification model.

Another embodiment of the present invention can include a method of creating a statistical classification model for use with an NLU system including processing training data using an existing model and receiving a user input specifying at least one parameter for assigning sentences of the training data correctly classified into a selected class to a fringe group or a core group. The training data can be updated by associating each group with a different subclass. The method also can include building a new statistical classification model from the updated training data and outputting the new statistical classification model.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
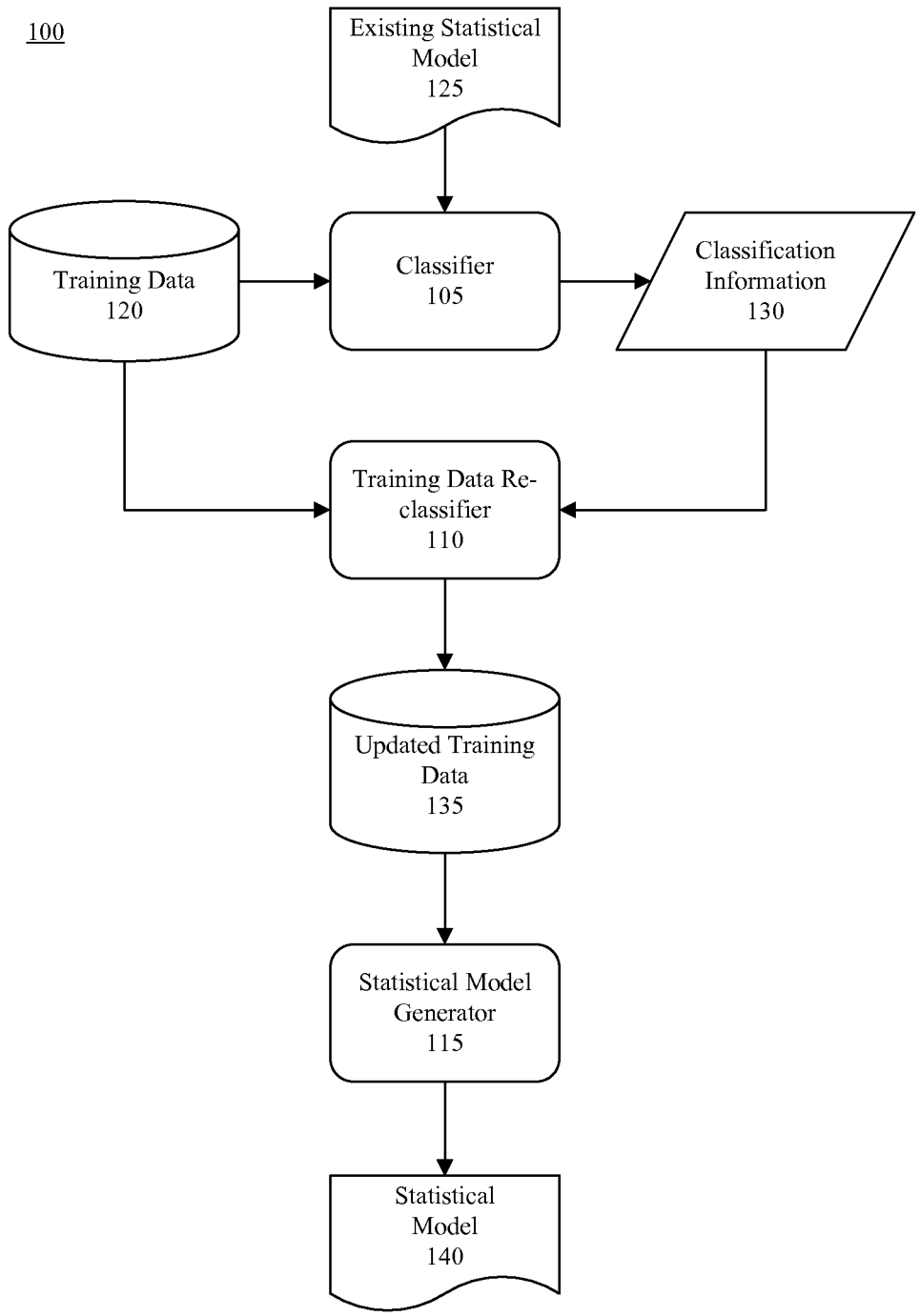
FIG. 1 is a block diagram illustrating a system for generating a statistical model in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to the classification of text within a Natural Language Understanding (NLU) system. Training data can be classified, or reclassified, in a manner that identifies outlier data as fringe data. Non-outlier data can be identified as core data. One or more subclasses can be created for fringe data and one or more subclasses can be created for the core data. For example, within a given class, training data can be separated into fringe data and core data. A subclass, or multiple subclasses, can be created for the fringe data of the class and the core data of the class. An updated, or new, statistical classification model (statistical model) can be created using this "reclassified" training data. Accordingly, a classifier using the updated statistical model can more accurately classify text input that representative of "fringe" data as well as text input representative of "core" data.

FIG. 1 is a block diagram illustrating a system 100 for reclassifying training data in accordance with one embodiment of the present invention. The system 100 further can generate a statistical model from the reclassified training data as will be described herein in greater detail. As show, the system 100 can include a classifier 105, a training data re-classifier (re-classifier) 110, and a statistical model generator (model generator) 115.

The classifier 105 can operate upon, e.g., classify, a corpus of training data 120. In classifying the training data 120, the classifier 105 can utilize an existing statistical model 125. Sentences of the training data 120 can be classified and classification information 130 can be output. As used herein, "outputting" or "output" can include, but is not limited to, writing to a file, writing to a user display or other output device, playing audible notifications, sending or transmitting to another system, exporting, or the like.

In illustration, assuming the existing statistical model 125 specifies a particular number of classes, e.g., "M" classes, the classification information 130 can specify a particular one of the M classes for each sentence of the training data 120. In addition, the classification information 130 can specify a confidence score for each sentence. The confidence score indicates the likelihood that a given sentence is classified into the correct one of the M classes, as determined using the existing statistical model 125.

The re-classifier 110 can receive the classification information 130 as input. The re-classifier 110 can process the training data 120 in accordance with the classification information 130 to generate and output updated training data 135. In general, the re-classifier 110 can group the sentences of the training data 120 into M groups, where each group includes only sentences that have been classified into a particular class. In one embodiment, only correctly classified sentences of the training data 120, which can include incorrectly classified sentences that are corrected, can be grouped or otherwise processed. Techniques for processing incorrectly classified sentences will be discussed herein in greater detail. The term "sentence," as used herein, refers to a portion of text such as a grammatically correct sentence, a grammatically incorrect sentence, a fragment or part of a sentence, or any other portion or unit of text that exists within the training corpus 115. There can be a one-to-one relationship between groups and classes. The re-classifier 110 can reclassify each group of sentences into two or more subclasses according to whether each respective sentence is considered to be representative of an outlier sentence or a non-outlier sentence. The updated training data 135 can include, or otherwise specify, these subclasses.

Thus, the updated training data 135 can be re-classified into more than the original M classes. For example, if each of the original M classes is sub-classified into a single fringe and a single core subclass, there will be "2×M" classes in all. It should be appreciated, however, that there can be zero or more core and zero or more fringe subclasses for each original class.

The model generator 115 can receive the updated training data 135 as input. Through the application of any of a variety of statistical model generation techniques, e.g., maximum entropy classification, maximum likelihood classification, or the like, the model generator 115 can create and output a statistical model 140. The statistical model 140 can be used within a classifier, for example, the classifier 105 when used within an NLU system, to process received text inputs and determine a classification for the text inputs. Use of the statistical model 140 can result in greater classification accuracy with respect to processing both outlier sentences as well as non-outlier sentences.

Figure 2:
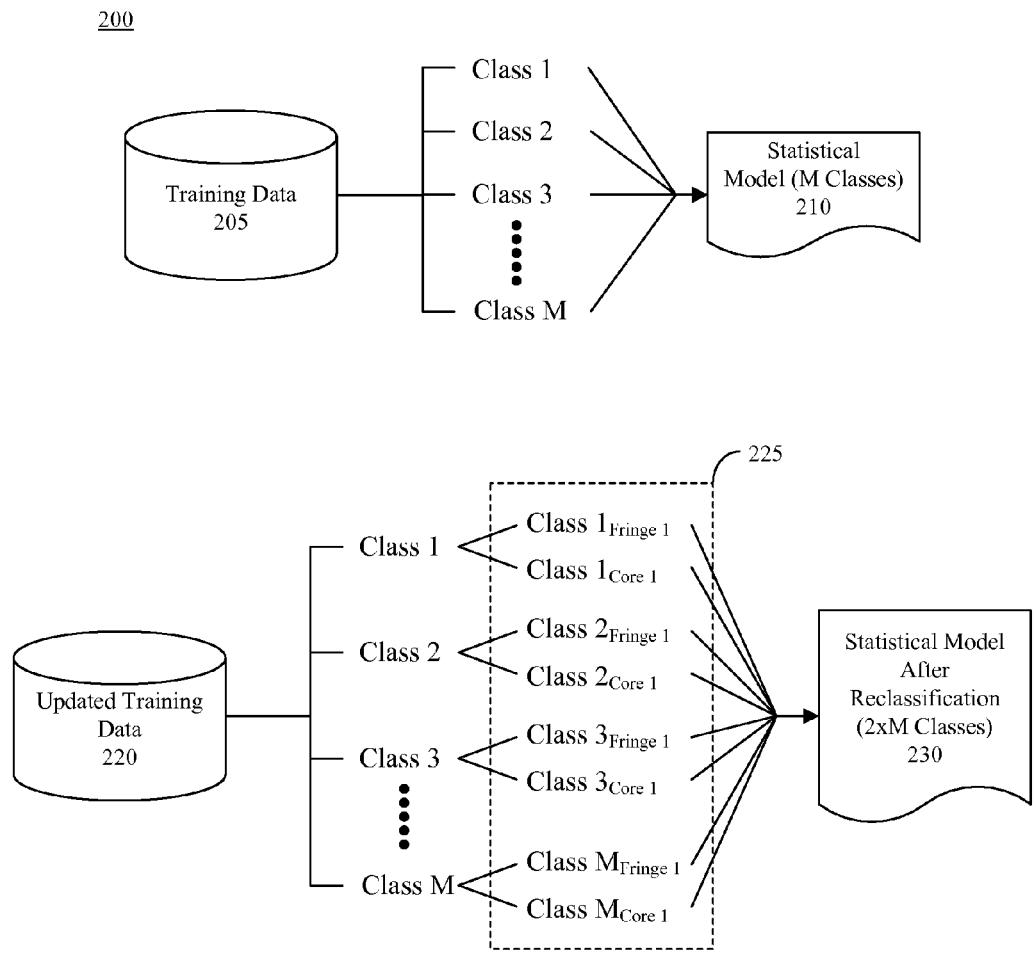
FIG. 2 is a block diagram illustrating reclassification of training data in accordance with another embodiment of the present invention.

FIG. 2 is a block diagram 200 illustrating reclassification of training data in accordance with another embodiment of the present invention. As shown, a corpus of training data 205 specifies classes 1 through some number M. The training data 205, specifying the classes 1–M, can be used to generate a statistical model 210 that also specifies M classes.

After application of a reclassification process 225 in accordance with the embodiments disclosed herein, an updated corpus of training data 220 can be generated. The updated training data 220 specifies a number of classes that is equal to 2×M. That is, each class is split into at least one fringe class and at least one core class as shown through the reclassification process 225. The updated training data 220, specifying the increased number of classes, in this case 2×M, can be processed to create a statistical model 230 that also specifies 2×M classes.

As will be demonstrated in greater detail herein, the number of subclasses created for a given class can be zero or more. That is, zero or more fringe subclasses can be created for a given class and zero or more core subclasses can be created for a given class. Further, the number of subclasses created for each class can be independent of the number of subclasses generated for each other class. For example, one fringe subclass and two core subclasses can be created for class 1. For class 2, no subclasses may be created. For class 3, zero fringe subclasses and two core subclasses can be created etc.

Figure 3:
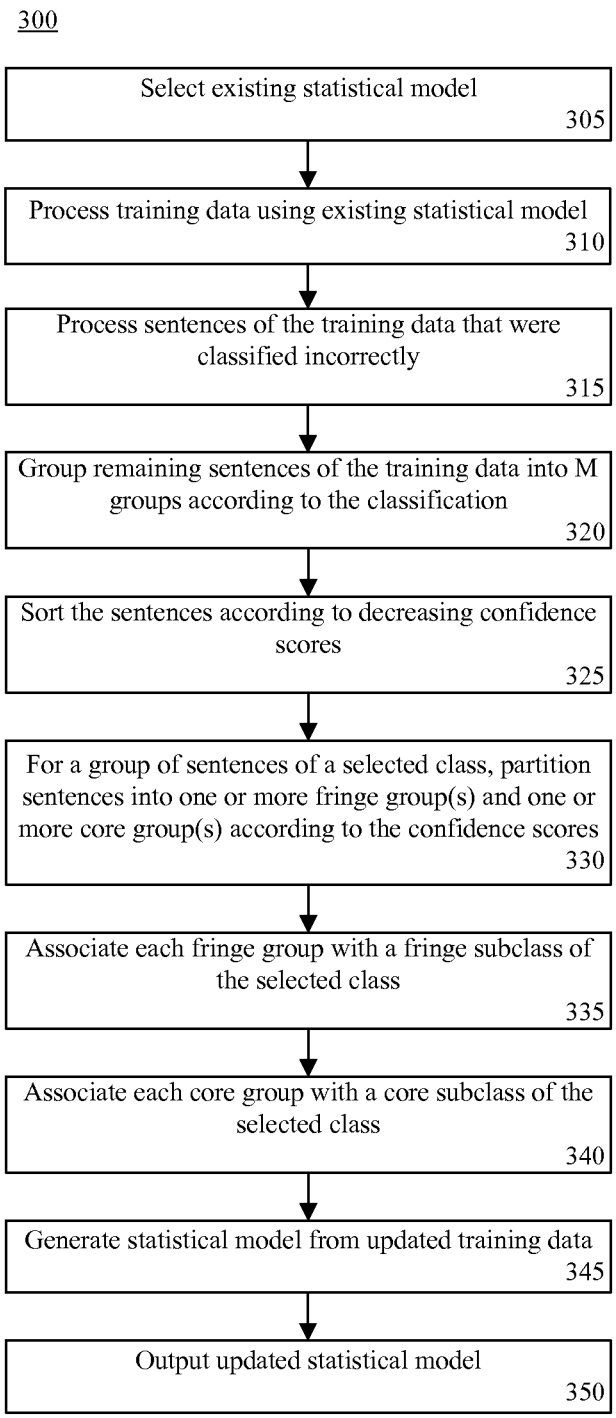
FIG. 3 is a flow chart illustrating a method of reclassifying training data in accordance with another embodiment of the present invention.

FIG. 3 is a flow chart illustrating a method 300 of reclassifying training data in accordance with another embodiment of the present invention. The method 300 can be implemented using the system described with reference to FIG. 1 or another system having similar functionality. Accordingly, the method 300 can begin in step 305 where an existing statistical model can be selected for processing. The existing statistical model can include M possible classes into which text can be classified.

In step 310, training data can be processed using the existing statistical model. A classifier can classify the training data using the existing statistical model. The classifier can output classification information that can specify a class for each sentence of the training data as well as a confidence score for each sentence. As noted, the confidence score for a given sentence indicates the likelihood that the class into which the sentence is classified is correct.

In step 315, the sentences of the training data not assigned to correct classes can be processed using a selected processing technique. In one embodiment, incorrectly classified sentences can be deleted or removed from the training data. In another embodiment, the classification errors can be corrected and the sentences can remain within the training data. In another embodiment, the sentences can be added to a fringe group, once created as defined herein. In still another embodiment, a new fringe group can be created exclusively for error sentences.

In step 320, the sentences of the training data can be grouped into M different groups according to the classification of each respective sentence. That is, the sentences can be separated into groups, where each group corresponds to one of the M classes available, or specified within, the existing statistical model. If sentences classified incorrectly are removed or the classification of such sentences is corrected, step 320 can apply only to sentences classified correctly. If incorrectly classified sentences are to be added to a fringe group, the sentences can be held out from the training data and added to a fringe group when a particular group is designated as fringe. If a new group is created exclusively for incorrectly classified sentences, such a group can be created and associated with one of the M classes of the existing statistical model. Such a group later can be designate as fringe.

In step 325, the sentences of each group can be sorted according to decreasing confidence scores. In step 330, for a selected group of sentences corresponding to a selected class, the sentences can be partitioned into one or more fringe groups and one or more core groups according to the confidence score of each respective sentence. The fringe groups and the core groups can be viewed as sub-groupings of the selected group of sentences, e.g., the sentences associated with the selected class. The sentences partitioned into a fringe group represent outlier sentences, while the sentences partitioned into the core group represent non-outlier sentences. The particular manner or technique used to partition the sentences will be described in greater detail with reference to FIGS. 4 and 5.

In step 335, each fringe group can be associated with a fringe subclass of the selected class. Fringe groups can be associated with fringe subclasses on a one-to-one basis. In step 340, each core group can be associated with a core subclass of the selected class. Core groups can be associated with core subclasses on a one-to-one basis. The various groupings described herein and the subclasses can be specified within the training data. For example, updated training data can be generated by associating the various groupings to subclasses described herein within the training data.

In step 345, a statistical model can be generated based upon the updated training data. This statistical model can be output and made available for use by a classifier within an NLU system. It should be appreciated that the statistical model generated from the updated training data can be considered an updated statistical model, a new statistical model, a re-trained statistical model, or the like. In any case, such a statistical model is constructed or built using updated training data specifying groupings and subclasses as described herein. It further should be appreciated that more than one, or all, groups of sentences corresponding to further classes of the existing statistical model can be processed as described with reference to FIG. 3. Accordingly, the method 300 is not intended to limit to present invention to processing any particular number of groups of sentences.

Figure 4:
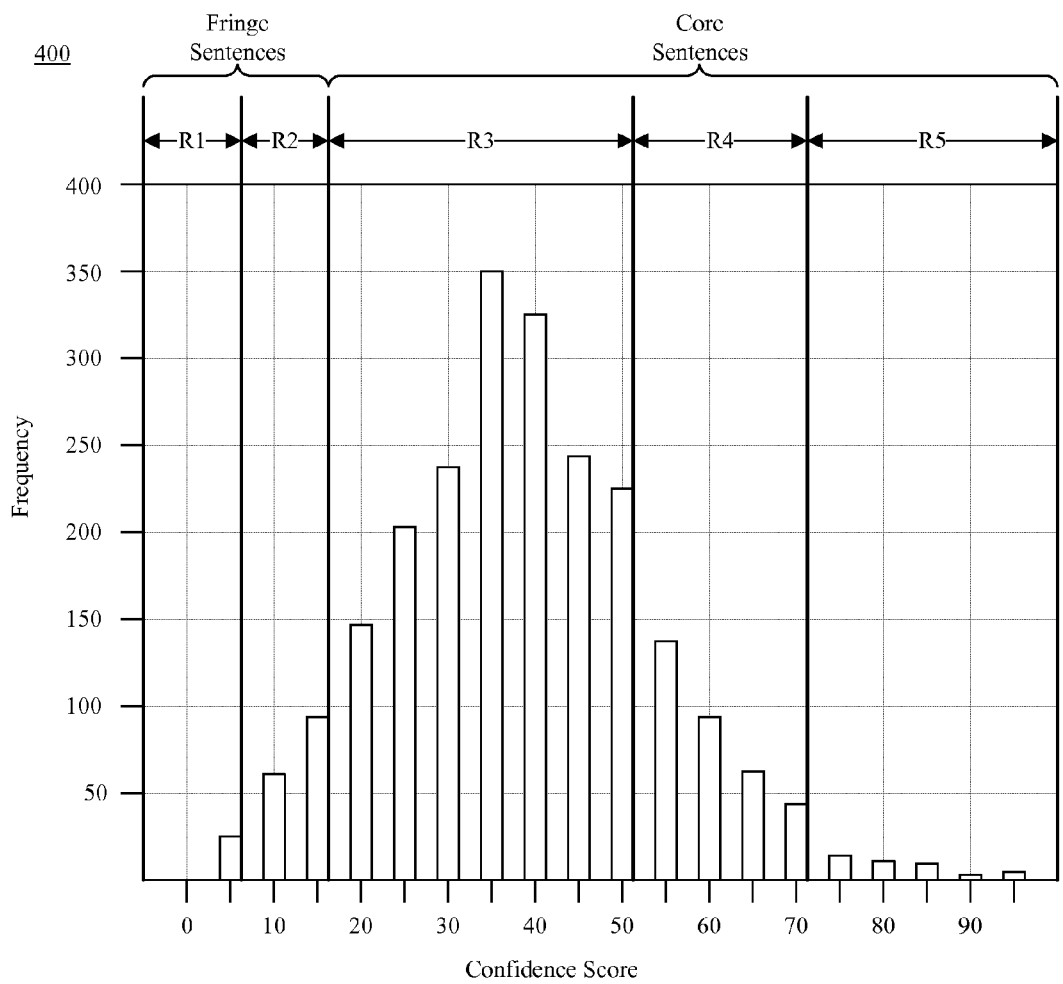
FIG. 4 is a histogram illustrating the creation of subclasses in accordance with another embodiment of the present invention.

FIG. 4 is a histogram 400 illustrating the creation of subclasses in accordance with another embodiment of the present invention. The histogram 400 illustrates how training data can be reclassified to create a new or updated statistical model. More particularly, the histogram 400 depicts how the sentences of the training data can be grouped and associated with subclasses according to the classification information.

The histogram 400 illustrates a distribution of sentences for a particular class, e.g., class C1, of an existing statistical model. As shown, the horizontal axis reflects the confidence score for the classification of sentences while the vertical axis reflects the frequency, or number of sentences, classified into class C1 for a given confidence score, or confidence score range as the case may be. For example, the histogram 400 indicates that 350 sentences are classified into class C1 with a confidence score of 35 or a confidence score in and around 35.

Within class C1, ranges R1, R2, R3, R4, and R5 have been defined. Each of ranges R1-R5 is defined by a minimum and a maximum confidence score, which further defines a group of sentences, e.g., a subgroup of the group of sentences corresponding to class C1. For example, range R1 includes all sentences classified into class C1 that have a confidence score of 5 and below. Range R2 includes all sentences classified into class C1 that have a confidence score greater than 5 and less than or equal to 15, etc. Accordingly, the ranges R1-R5 define five groups of sentences, which correspond to five subclasses of class C1. Class C1 can be said to be the parent class of the subclasses corresponding to ranges R1-R5. The subclasses of class C1 can be denoted as subclasses C1.1, C1.2, C1.3, C1.4, and C1.5, corresponding to ranges R1-R5 respectively.

It should be appreciated that while five ranges (and thus five groups and subclasses) are defined in FIG. 4, the present invention is not limited to a particular number of ranges. For example, more than five ranges can be defined and fewer than five ranges can be defined according to preference. Still, at least two ranges, and thus, subclasses, must be defined for at least one class, in this case class C1, in accordance with the embodiments disclosed herein. Depending upon the data and confidence scores, however, for one or more classes, no groups, e.g., subgroups of the group of sentences corresponding to such a class, or subclasses may be defined. Accordingly, the original grouping of sentences for the class can be retained in the new model to be generated.

A threshold confidence score can be selected which can be used to separate those ranges that include outlier sentences from those ranges that include non-outlier sentences. In the example pictured in FIG. 4, the sentences of the training data falling into the groups corresponding to ranges R1 and R2 have been classified as fringe sentences, e.g., outlier sentences. Accordingly, in this example, the fringe sentences include two subclasses C1.1. and C1.2 corresponding to ranges R1 and R2 respectively. The sentences corresponding to ranges R3-R5 have been classified as core sentences, e.g., non-outlier sentences. Thus, the core sentences include three subclasses C1.3, C1.4, and C1.5 corresponding to ranges R3, R4, and R5 respectively. Accordingly, class C1 would include two fringe subclasses C1.1 and C1.2 and three core subclasses C1.3, C1.4, and C1.5.

As noted, fewer or more ranges can be defined as may be desired. If, for example, only two ranges are defined, one range can be defined for fringe sentences and the other range for core sentences. In that case, the class C1 would have only two subclasses. One subclass can represent fringe sentences and the other subclass can represent core sentences. Additionally, one or more fringe subclasses can be defined and one or more core subclasses can be defined. The number of core subclasses can be independent of the number of fringe subclasses. That is, there need not be an equal number of core and fringe subclasses. Further, a plurality of one type of subclass can be defined while only a single subclass of the other is defined.

In accordance with another embodiment, the histogram 400 can represent a graphical user interface (GUI) of a system for reclassifying training data, e.g., a re-classifier as discussed with reference to FIG. 1. For example, a re-classifier can analyze classification data and present a histogram such as histogram 400. Through the GUI, a user can specify, or define, parameters such as the threshold between fringe and core sentences as well as create, delete, merge, etc., ranges of sentences (corresponding to groups and subclasses).

For example, a user can define parameters such as ranges and thresholds using various menu commands. In another example, the user can be permitted to draw visual lines similar to those illustrated in FIG. 4 of the histogram 400. The user can slide the lines, representing range boundaries, across the histogram to desired locations. When finished, the user can indicate that the training data has been updated and instruct a model generator to process, or re-process, the updated training data to generate a statistical model.

In one embodiment, the particular ranges defined can be specified on a per-class basis. That is, each class of the M classes of the existing statistical model can be broken down into ranges. The confidence score ranges for one of the M classes need not be the same as the confidence score ranges of another one of the M classes. In another embodiment, the ranges can be specified one time for all classes of the M classes.

Figure 5:
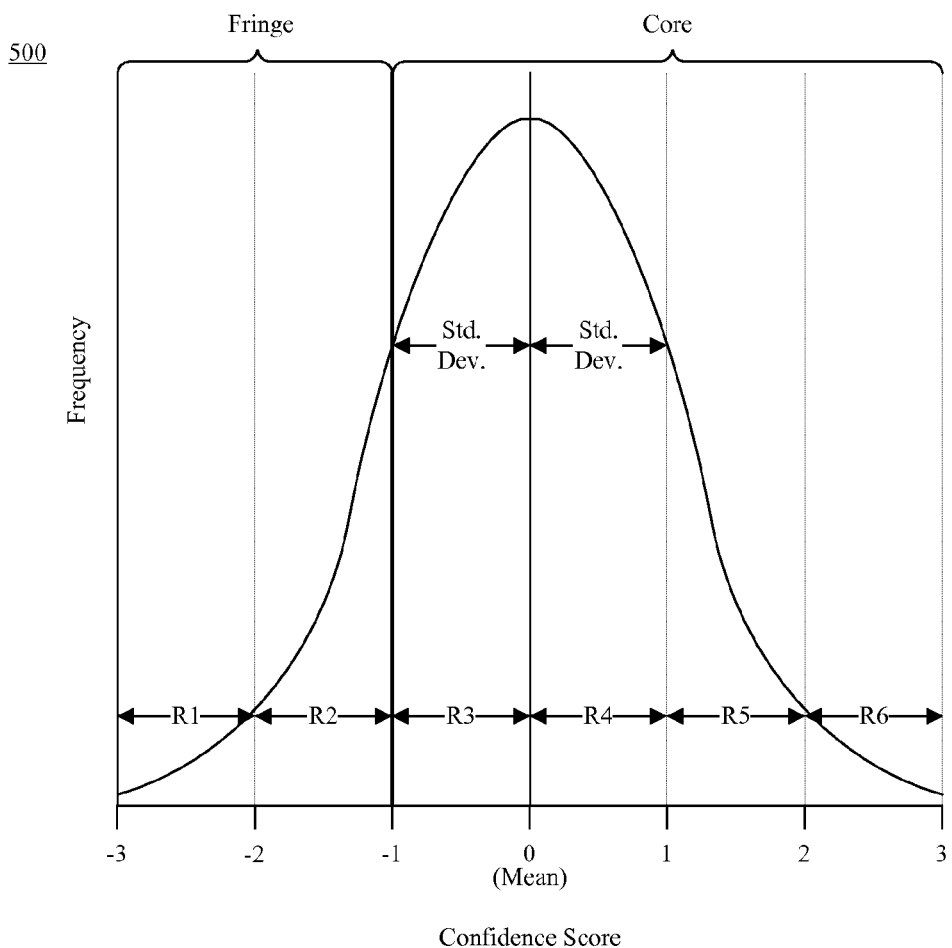
FIG. 5 is a graph illustrating the creation of subclasses in accordance with another embodiment of the present invention.

FIG. 5 is a graph 500 illustrating the creation of subclasses in accordance with another embodiment of the present invention. FIG. 5 illustrates that sentences also can be grouped using standard deviation as a mechanism for specifying ranges of confidence scores. Graph 500 depicts the sentences of the training data shown as a Gaussian or Normal distribution of confidence scores for a selected class, e.g., class C1. In this example, the threshold between fringe sentences and core sentences can be selected according to standard deviation, e.g., one standard deviation below the mean of confidence scores. Thus, ranges R1 and R2 can be designated as fringe sentences. In this example, the class C1 will have two fringe subclasses C1.1 and C1.2 corresponding to ranges R1 and R2 respectively. Ranges R3-R6 can be designated as core sentences. Accordingly, class C1 will have four core subclasses C1.3, C1.4, C1.5, and C1.6 corresponding to ranges R3-R6 respectively. As was the case with respect to FIG. 3, fewer or more ranges can be defined so long as at least one range is defined that specifies fringe sentences and at least one other range is defined that specifies core sentences.

In another embodiment, particular ranges, whether specified as shown in FIG. 4 or in FIG. 5, can be discarded if considered to be extreme outliers. For example, range R1 can be considered to include extreme outliers and may be deleted if so desired. Such a determination can be made according to the number of sentences within the range, whether the confidence scores of such sentences exceeds some minimum threshold, or a combination of both.

As noted with respect to FIG. 4, the graph 500 also can be illustrative of a GUI displayed as part of a training data reclassification system. In this example, the boundaries between ranges can be specified in terms of standard deviations. For example, the user can specify boundaries in terms of some multiplier "X" of a standard deviation, where X can be any number greater than zero, e.g., 0.5, 0.6, 1.2, etc. The user can access menu commands or graphically manipulate the graph 500, e.g., by sliding range boundaries etc.

Figure 6:
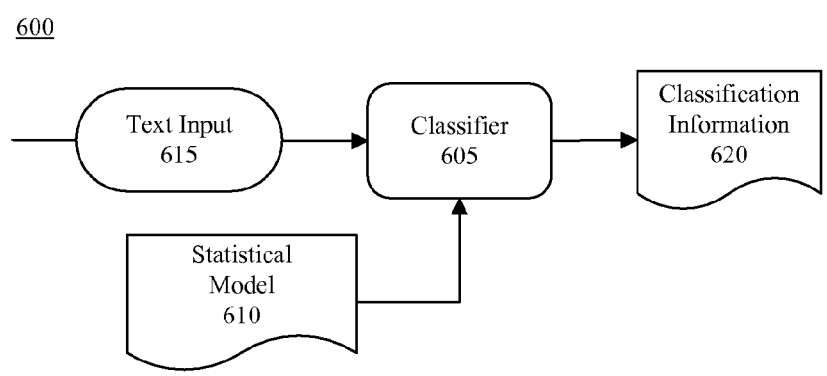
FIG. 6 is a block diagram illustrating a natural language understanding system in accordance with another embodiment of the present invention.

FIG. 6 is block diagram illustrating an NLU system 600 in accordance with another embodiment of the present invention. The NLU system 600 can include a classifier 605 and a statistical model 610. The statistical model 610 can be derived in accordance with the embodiments described herein with reference to FIGS. 1-5. Accordingly, the classifier 605 can receive a text input 615 and determine a classification for the text input 615. The classifier 605 can output classification information 620.

In one embodiment, the classification information 620 can specify the particular class to which the text input 615 has been classified, e.g., class C1, C2, C3, etc. For example, the classifier can determine the particular subclass to which the text input 615 is classified, such as C1.1. That subclass can be related to the parent class C1. Accordingly, the parent class C1 of the predicted subclass can be output.

In another embodiment, subclass information can be output with or without the parent class. For example, the subclass C1.1 can be output with or without the parent class C1. In another embodiment, the subclass information can be used to qualitatively assess the final classification produced by the classifier 605. For example, if the classifier 605 assigns text input 615 to subclass C1.1, the classifier 605 can determine that the quality of the classification of text input 615 is "low" since subclass C1.1 corresponds to the lower end of the histogram or statistical graph of class C1 sentences. Similarly, an output of C1.3 can be considered "medium" quality and an output of C1.5 can be considered "High" or "Very High".

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of creating a statistical classification model for use with a natural language understanding system, the method comprising:
   via a processor, processing training data using an existing statistical classification model;
   via the processor, selecting sentences of the training data correctly classified into a selected class of the existing statistical classification model;
   via the processor, assigning each selected sentence of the training data to a fringe group or a core group according to confidence score;
   via the processor, updating the training data by associating the fringe group with a fringe subclass of the selected class and the core group with a core subclass of the selected class;
   via the processor, building a new statistical classification model from the updated training data; and
   via the processor, outputting the new statistical classification model.

2. The method of claim 1, wherein at runtime the method further comprises:
   via the processor, classifying a text input into the fringe subclass or the core subclass of the selected class according to the new statistical classification model; and
   via the processor, outputting an indication that the text input belongs to the selected class.

3. The method of claim 2, further comprising, via the processor, outputting a measure of accuracy for the indication that depends upon which subclass of the selected class into which the text input is classified.

4. The method of claim 1, wherein assigning the selected sentences further comprises, for each selected sentence, assigning the selected sentence to the fringe group or the core group according to which range of a plurality of ranges comprises a confidence score of the selected sentence.

5. The method of claim 1, wherein assigning the selected sentences further comprises:
   determining a distribution of confidence scores for the selected sentences; and
   for each selected sentence, assigning the selected sentence to the fringe group or the core group according to a distance between the confidence score of the selected sentence and a mean confidence score on the distribution.

6. The method of claim 1, wherein assigning the selected sentences further comprises, for each selected sentence, assigning the selected sentence to the fringe group or the core group according to a length of the selected sentence.

7. The method of claim 1, wherein assigning the selected sentences further comprises:
   for each selected sentence, assigning the selected sentence to one of a plurality of fringe groups or one of a plurality of core groups, wherein updating the training data further comprises associating each of the plurality of fringe groups with one of a plurality of fringe subclasses and each of the plurality of core groups with one of a plurality of core subclasses.

8. The method of claim 7, wherein assigning the selected sentences further comprises:
   identifying a plurality of confidence score ranges according to confidence scores of the selected sentences, wherein each of the plurality of confidence score ranges defines one of the plurality of fringe groups or one of the plurality of core groups; and
   for each selected sentence, assigning the selected sentence to one of the plurality of fringe groups or one of the plurality of core groups according to the confidence score range comprising the confidence score of the selected sentence.

9. The method of claim 7, wherein assigning the selected sentences further comprises:
   determining a distribution of confidence scores for the selected sentences; and
   for each selected sentence, assigning the selected sentence to one of the plurality of fringe groups or one of the plurality of core groups according to a distance between the confidence score of the selected sentence and a mean confidence score of the distribution.

10. The method of claim 7, wherein assigning the selected sentences further comprises:
    identifying a plurality of sentence length ranges, wherein each of the plurality of sentence length ranges defines one of the plurality of fringe groups or one of the plurality of core groups; and
    for each selected sentence, assigning the selected sentence to one of the plurality of fringe groups or one of the plurality of core groups according to which of the plurality of sentence length ranges comprises a length of the selected sentence.

11. A computer-readable storage comprising computer-usable program code that creates a statistical classification model for a classifier within a natural language understanding system, the computer-readable storage comprising:
    computer-usable program code that processes training data using an existing statistical classification model;
    computer-usable program code that selects sentences of the training data correctly classified into a selected class of the existing statistical classification model;
    computer-usable program code that assigns each selected sentence of the training data to a fringe group or a core group according to confidence score;
    computer-usable program code that updates the training data by associating the fringe group with a fringe subclass of the selected class and the core group with a core subclass of the selected class;
    computer-usable program code that builds a new statistical classification model from the updated training data; and
    computer-usable program code that outputs the new statistical classification model, wherein
    the computer-readable storage is not a transitory, propagating signal per se.

12. The computer-readable storage of claim 11, wherein the computer-usable medium further comprises:
    computer-usable program code that, at runtime of the classifier, classifies a text input into the fringe subclass or the core subclass of the selected class according to the new statistical classification model; and
    computer-usable program code that outputs an indication that the text input belongs to the selected class.

13. The computer-readable storage of claim 12, wherein the computer-readable storage further comprises computer-usable program code that outputs a measure of accuracy for the indication that depends upon which subclass of the selected class into which the text input is classified.

14. The computer-readable storage of claim 11, wherein the computer-usable program code that assigns the selected sentences further comprises computer-usable program code that, for each selected sentence, assigns the selected sentence to the fringe group or the core group according to which range of a plurality of ranges comprises a confidence score of the selected sentence.

15. The computer-readable storage of claim 11, wherein the computer-usable program code that assigns selected sentences further comprises:
    computer-usable program code that determines a distribution of confidence scores for the selected sentences; and
    computer-usable program code that, for each selected sentence, assigns the selected sentence to the fringe group or the core group according to a distance between the confidence score of the selected sentence and a mean confidence score on the distribution.

16. The computer-readable storage of claim 11, wherein the computer-usable program code that assigns the selected sentences further comprises computer-usable program code that, for each selected sentence, assigns the selected sentence to the fringe group or the core group according to a length of the selected sentence.

17. The computer-readable storage of claim 11, wherein the computer-usable program code that assigns the selected sentences further comprises:
    computer-usable program code that, for each selected sentence, assigns the selected sentence to one of a plurality of fringe groups or to one of a plurality of core groups, wherein the computer-usable program code that updates the training data further comprises computer-usable program code that associates each of the plurality of fringe groups with one of a plurality of fringe subclasses and each of the plurality of core groups with one of a plurality of core subclasses.

* * * * *